US009378555B2

(12) United States Patent
Elgersma et al.

(10) Patent No.: US 9,378,555 B2
(45) Date of Patent: Jun. 28, 2016

(54) ENHANCED OUTLIER REMOVAL FOR 8 POINT ALGORITHM USED IN CAMERA MOTION ESTIMATION

(71) Applicant: Honeywell International Inc., Morristown, NJ (US)

(72) Inventors: Michael Ray Elgersma, Plymouth, MN (US); Subhabrata Ganguli, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 213 days.

(21) Appl. No.: 14/073,645

(22) Filed: Nov. 6, 2013

(65) Prior Publication Data

US 2015/0125027 A1    May 7, 2015

(51) Int. Cl.
*G06K 9/00* (2006.01)
*G06T 7/20* (2006.01)
*G06T 7/00* (2006.01)

(52) U.S. Cl.
CPC .. *G06T 7/20* (2013.01); *G06T 7/004* (2013.01)

(58) Field of Classification Search
None
See application file for complete search history.

(56) References Cited

U.S. PATENT DOCUMENTS

| 7,251,356 B2 | 7/2007 | Seo et al. | |
| 2009/0279741 A1* | 11/2009 | Susca et al. | 382/107 |
| 2013/0107039 A1 | 5/2013 | Mehta et al. | |
| 2013/0335528 A1* | 12/2013 | Vishwanath et al. | 348/46 |

OTHER PUBLICATIONS

Li et al., "An Improved Evolutionary Algorithm for Fundamental Matrix Estimation" IEEE, Aug. 2013, pp. 226-231.*
Hartley "In Defense of the Eight-Point Algorithm" 1997, IEEE, pp. 580-593.*
Hartley et al., "Degeneracies in two views", "Multiple View Geometry in computer vision Second Edition", 2000, 2003, Publisher: Cambridge University Press, Published in: US.
Huang et al., "Robust Fundamental Matrix Estimation with Accurate Outlier Detection", "Journal of Information Science and Engineering 23", 2007, pp. 1213-1225, Publisher: National Tsing Hua University, Published in: TW.
Khatoonabadi et al., "Compressed-Domain Global Motion Estimation Based on the Normalized Direct Linear Transform Algorithm", "Presented at ITC-CSCC'13", Jul. 2013, pp. 14, Published in: KR.

(Continued)

*Primary Examiner* — Weiwen Yang
(74) *Attorney, Agent, or Firm* — Fogg & Powers LLC

(57) ABSTRACT

A method to filter outliers in an image-aided motion-estimation system is provided. The method includes selecting eight-image-points in a first image received from a moving imaging device at at least one processor; selecting eight-image-points in a second image that correspond to the selected eight-image-points in the first image at the at least one processor, the second image being received from the moving imaging device; scaling the selected image-points at the at least one processor so the components of the selected image-points are between two selected values on the order magnitude of 1; building an 8-by-9 matrix (A) from the scaled selected image-points at the at least one processor; determining a condition number for the 8-by-9 matrix at the at least one processor; and rejecting the 8-by-9 matrix built from the selected image-points when the determined condition number is greater than or equal to a condition-number threshold.

16 Claims, 8 Drawing Sheets

(56) References Cited

OTHER PUBLICATIONS

European Patent Office, "Extended European Search Report from EP Application No. 14187219.2 mailed Jun. 12, 2015", "from Foreign Counterpart of U.S. Appl. No. 14/073,645", Jun. 12, 2015, pp. 1-7, Published in: EP.

Hartley, "In Defence of the 8-point Algorithm", "Proceedings of the Fifth International Conference on Computer Vision", Jun. 20-23, 1995, pp. 1064-1070.

Matejka, "Robust Two-View Geometry Estimation from Region Correspondences", "Retrieved from the internet: URL: http://cyber.felk.cvut.cz/research/theses/papers/360.pdf", May 12, 2013, Publisher: Centre for Machine Perception Czech Technical University in Prague.

Yang et al., "Monocular Vision based Robot Self-localization", "Proceedings of the 2010 IEEE International Conference on Robotics and Biomimetics", Dec. 14-18, 2010, pp. 1189-1193, Published in: Tianjin, CN.

* cited by examiner

ENHANCED OUTLIER REMOVAL FOR 8 POINT ALGORITHM USED IN CAMERA MOTION ESTIMATION

BACKGROUND

A standard algorithm used for camera motion estimation based on optical image matching is the 8-point algorithm, which compares sets of eight-image-points in each of two sequentially obtained images. Currently, 8-point algorithms send the obtained sets of eight-image-points and the corresponding computed rotations and translations to a RANdom SAmple Consensus (RANSAC) algorithm. The RANSAC algorithm estimates parameters of a mathematical model from a set of observed data which contains outliers. RANSAC is a non-deterministic algorithm that produces a correct result with a certain probability. However, when many bad solutions are in the sets of eight-image-points sent to the RANSAC algorithm, the RANSAC algorithm is unable to decide which solution is good.

SUMMARY

The present application relates to a method to filter outliers in an image-aided motion-estimation system. The method includes selecting eight-image-points in a first image received from a moving imaging device at at least one processor; selecting eight-image-points in a second image that correspond to the selected eight-image-points in the first image at the at least one processor, the second image being received from the moving imaging device; scaling the selected image-points at the at least one processor so the components of the selected image-points are between two selected values on the order magnitude of 1; building an 8-by-9 matrix (A) from the scaled selected image-points at the at least one processor; determining a condition number for the 8-by-9 matrix at the at least one processor; and rejecting the 8-by-9 matrix built from the selected image-points when the determined condition number is greater than or equal to a condition-number threshold.

DRAWINGS

In accordance with common practice, the various described features are not drawn to scale but are drawn to emphasize features relevant to the present invention. Like reference characters denote like elements throughout figures and text.

DETAILED DESCRIPTION

Figure 1A:
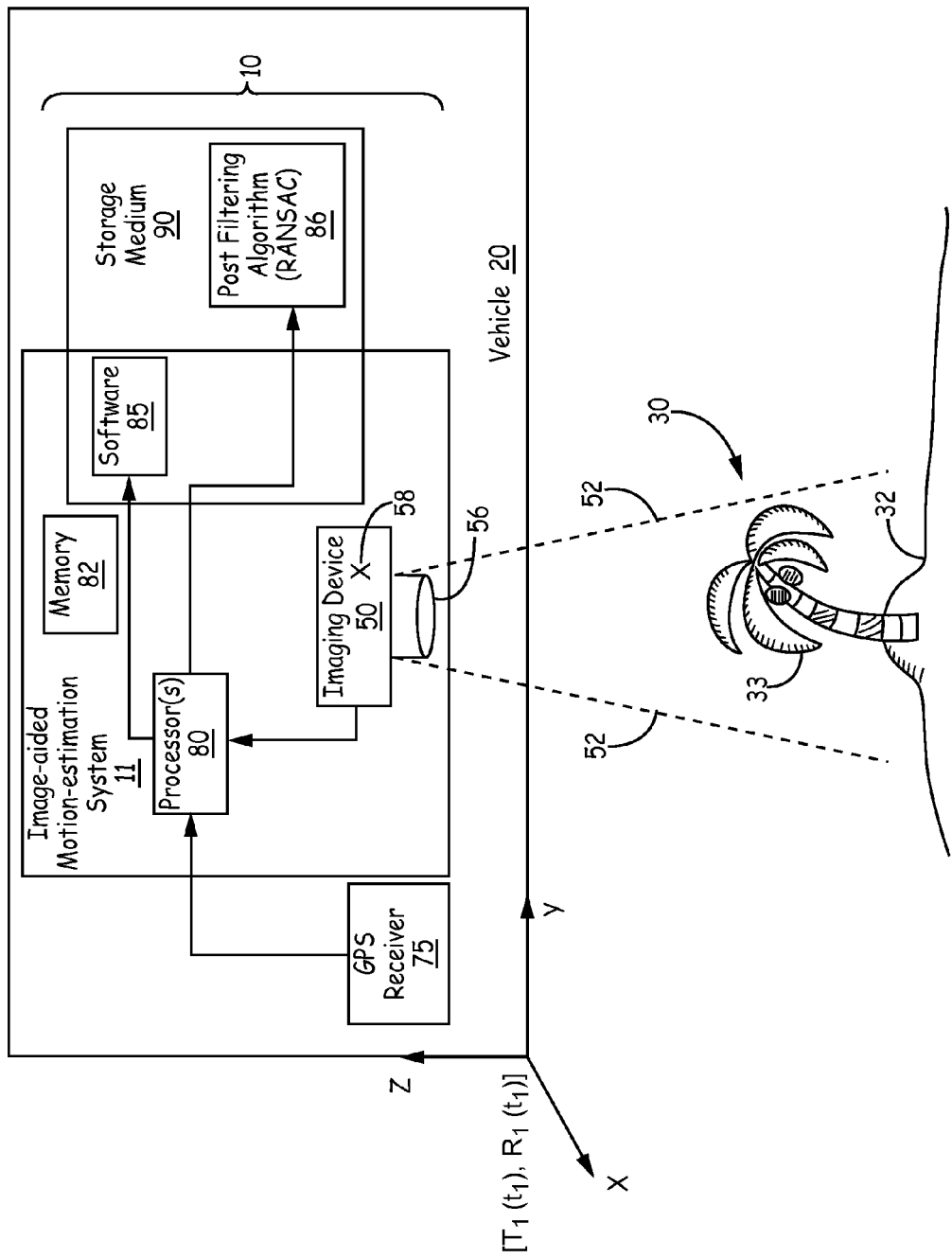
FIG. 1A is an embodiment of an optically-aided-navigation system to remove outliers in an image-aided motion-estimation system in a moving vehicle at a first time.

In the following detailed description, reference is made to the accompanying drawings that form a part hereof, and in which is shown by way of specific illustrative embodiments, ways in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Optical image matching technologies are implemented as an optical navigation system in vehicles that are unable, at least temporarily, to use Global Positioning System (GPS) systems to determine position. The optical image matching technology estimates vehicle rotation and translation between a first time and a second time by comparing corresponding image-points in two images taken at the first time and the second time by a camera (imaging device) mounted on the vehicle. In one implementation of this embodiment, if GPS is denied to a moving vehicle, for any reason, the technology described herein is automatically implemented to continue to provide navigation data to the moving vehicle. In another implementation of this embodiment, the optical navigation system is used as a camera aided navigation system. In yet another implementation of this embodiment, the technology described herein can be implemented as the only navigation system for a vehicle. For example, a robot (i.e., a robotic vehicle) operating in a building that blocks GPS signals can implement this technology independent of GPS. In this case, the robot is calibrated with a known-initial position in the building when initially positioned at the known-initial position.

The technology described herein is applicable to optical navigation for platforms that employ the currently available 8 point/RANSAC feature matching technique. Such platforms include aircraft, ground vehicles, marine vehicles, robotic vehicles (robots), and soldiers wearing personal navigation equipment. Aircraft include Unmanned Aerial Vehicles (UAV). Embodiments of the technology described herein limit the number of outliers in the data sent to a post-filtering algorithm so the post-filtering algorithm is able to robustly estimate model parameters for optical navigation. The technology described herein improves the accuracy of the optical image matching by reducing time required to match images, reducing sensitivity to outliers in the data, and addressing geometrical difficulties that have not previously been solved in currently available open research. As defined herein, an outliner is a data point (or data set) that is distinctly separate from the rest of the data points (or data sets).

The techniques described herein: provide a scaling method to minimize errors in the 8-point algorithm; identify sets of eight points and two camera positions (camera-location points in three dimensions) that result in inherently large rotation and translation errors, which cannot be sufficiently reduced by scaling; delete the sets of eight-image-points that are outliers (e.g., that would result in large rotation and translation errors if used in the RANSAC algorithm). By removing most bad sets of eight-image-points and two camera positions (e.g., by not sending most of the bad data to the RANSAC algorithm), the RANSAC algorithm has a better chance of obtaining a good solution.

Figure 1B:
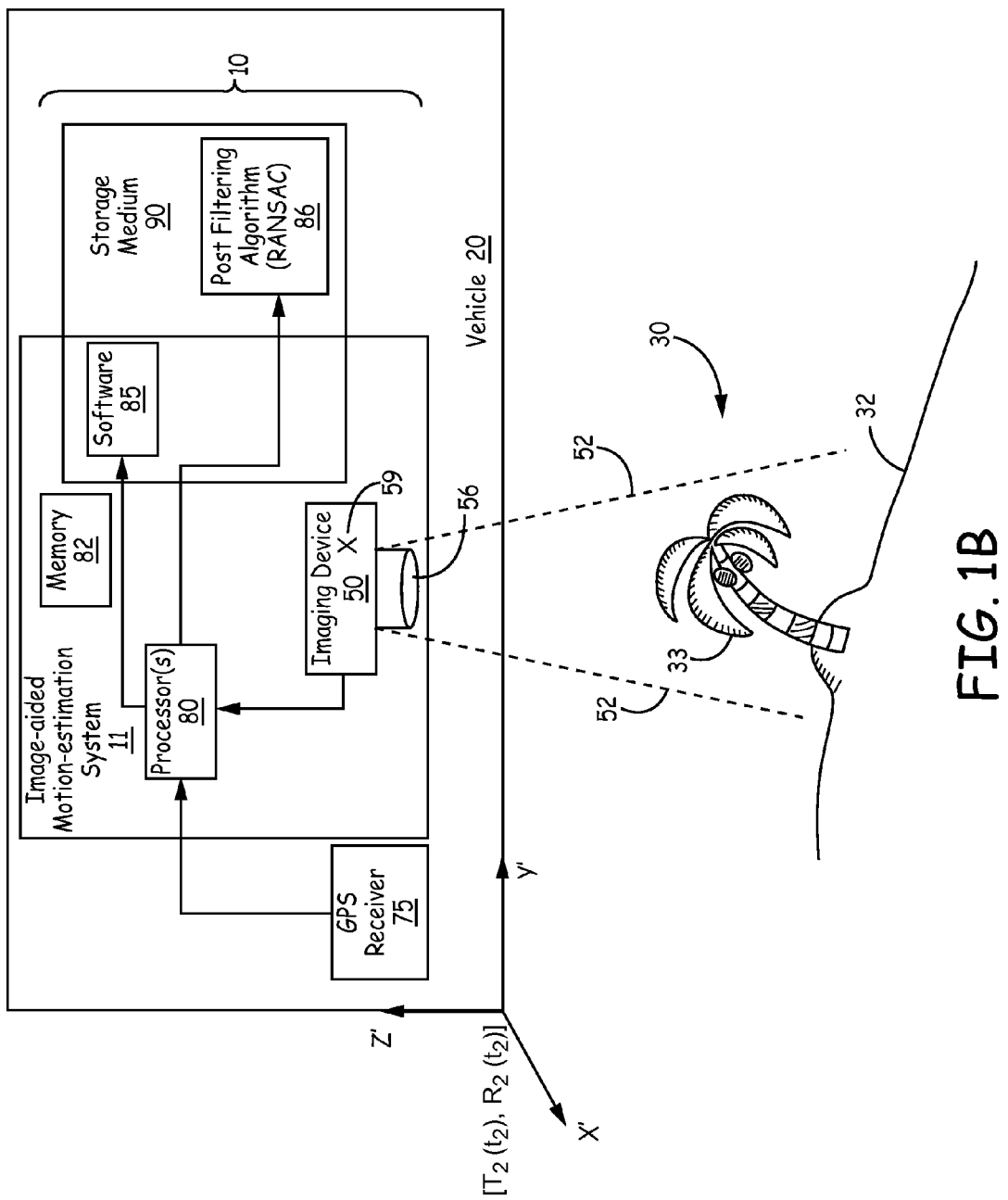
FIG. 1B is the optically-aided-navigation system of FIG. 1A in the moving vehicle at a second time.
Figure 2:
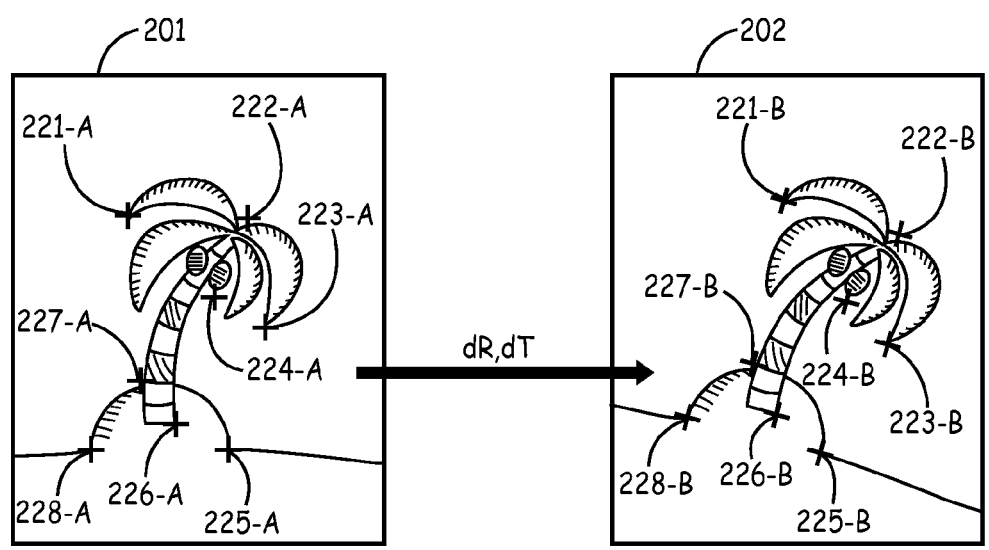
FIG. 2 shows a first image and a second image captured by the imaging device in the image-aided motion-estimation system of FIGS. 1A and 1B at the first time and the second time, respectively.

FIG. 1A is an embodiment of an optically-aided-navigation system 10 to remove outliers in an image-aided motion-estimation system 11 in a moving vehicle 20 at a first time $t_1$. FIG. 1B is an embodiment of the optically-aided-navigation system 10 of FIG. 1A in the vehicle 20 at a second time $t_2$. FIG. 2 shows a first image 201 and a second image 202 captured by an imaging device 50 of FIG. 1A at the first time $t_1$ and the second $t_2$, respectively. As is well known, the first image 201 and a second image 202 are two-dimensional (2D) representations of points in three-dimensional (3D) space.

The movable vehicle 20 is capable of rotations, represented by a 3×3 rotation matrix (R) that is a function of three rotation angles: pitch, yaw, and roll, and vector translations (T) in three dimensions (X, Y, Z). As defined herein, the $i^{th}$ position vector $T_i$ is a location $(X_i, Y_i, Z_i)$ in the 3-dimensional space spanned by vector (X, Y, Z), where i is a positive integer. As defined herein an $i^{th}$ orientation matrix $R_i$ in space is a function of angles (pitch$_i$, yaw$_i$, roll$_i$). As shown in FIG. 1A, at the first time $t_1$, the moving vehicle 20 is at a first position $T_1(t_1)$ with a first orientation $R_1(t_1)$. As shown in FIG. 1B, at the second time $t_2$, the moving vehicle 20 is at a second position $T_2(t_2)$ with a second orientation $R_2(t_2)$. The first position $T_1(t_1)$ is also referred to herein as first position $T_1$ and the first orientation $R_1(t_1)$ is also referred to herein as first orientation $R_1$. The second position $T_2(t_2)$ is also referred to herein as second position $T_2$ and the second orientation $R_2(t_2)$ is also referred to herein as second orientation $R_2$.

At first time $t_1$, the moving vehicle 20 is at a first position $T_1=(X_1, Y_1, Z_1)$ with a first orientation $R_1$ that is a function of angles (pitch$_1$, yaw$_1$, roll$_1$). Likewise, at second time $t_2$, the moving vehicle 20 is at a second position $T_2=(X_2, Y_2, Z_2)$ with a second orientation $R_2$ that is a function of (pitch$_2$, yaw$_2$, roll$_2$). Between the second time and the first time, the vehicle 20 has been transposed in position by $\Delta T=T_2-T_1= [(X_2-X_1), (Y_2-Y_1), Z_2-Z_1)]$ and has been rotated in orientation by $\Delta R=$(transpose $R_2$)*$R_1$ (FIG. 2), where the symbol * represents multiplication.

The optically-aided-navigation system 10 onboard the moving vehicle 20 is referred to herein as "system 10". The optically-aided-navigation system 10, from which outliers are filtered, includes the image-aided motion-estimation system 11, an optional GPS receiver 75, and a post-filtering algorithm 86. The image-aided motion-estimation system 11 includes at least one processor 80, an imaging device 50 fixedly positioned in (e.g., fixedly attached to or fixedly held in) a vehicle 20 as images are collected, memory 82, and the software 85 stored in the storage medium 90. In one implementation of this embodiment, the memory 82 is stored in the storage medium 90. In another implementation of this embodiment, an imaging device 50 is fixedly positioned on a robot as images are collected. In yet another implementation of this embodiment, an imaging device 50 is fixedly positioned on the outside of a vehicle 20 as images are collected.

The optically-aided-navigation system 10 is used to remove outliers in sets of eight-image-points and two camera positions before they are sent to the post-filter algorithm 86. By removing outliers before sending data to the post-filtering algorithm 86, the post-filtering algorithm 86 advantageously provides a more accurate output. In one implementation of this embodiment, the post-filtering algorithm 86 is a RANSAC algorithm 86.

The at least one processor 80 is also referred to herein as "processor 80". The GPS receiver 75 is communicatively coupled to the at least one processor 80. The processor 80 is configured to recognize when the GPS receiver 75 is unavailable or if the GPS receiver 75 is providing faulty data. If data output from the global positioning system that is communicatively coupled to the GPS receiver 17 is interrupted, the at least one processor 80 signals the imaging device 50 to collect the first image 201 and the second image 202 in order to navigate using the image-aided motion-estimation system 11. In one implementation of this embodiment, the one processor 80 continuously collects images from the imaging device 50 to provide additional aide for an inertial-based navigation system on board the vehicle 20.

The processor 80 is communicatively coupled to receive image data from the imaging device 50 and to output filtered data to the post-filtering algorithm 86 in the storage medium 90. The processor 80 is configured to execute the software 85 stored in the storage medium 90 to prevent data with outliers from being sent to the post-filtering algorithm 86.

The imaging device 50 includes a lens system generally represented by a single lens indicated by the numeral 56 in FIGS. 1A and 1B. The imaging device 50 has a field of view, the extent of which is represented generally by the dashed lines 52. The center of the imaging device 50, defined herein as the 3D camera-location point, at the first time $t_1$ is represented generally at the "x" labeled 58 in FIG. 1A. The camera-location point 58 is defined herein as any point within the camera that is fixed (the same) for all the measurements. The center of the imaging device 50 at the second time $t_2$ is represented generally at the "x" labeled 59 at FIG. 1B and, according to the definition of center of the imaging device 50, camera-location point 58 and point 59 are the same physical point in the imaging device 50. The camera-location points 58 and 59 are points in 3-dimensional space that identify the 3-dimensional (3D) position of the camera at the first time $t_1$, when the vehicle 20 is at position $T_1$ and orientation $R_1$, and the second time $t_2$, when the vehicle 20 is at position $T_2$ and orientation $R_2$. The camera-location points 58 and 59 are also referred to herein as the "two imaging device locations in 3D space 58 and 59".

The imaging device 50 is also referred to herein as a camera 50, and can include any one of various imaging technologies, including but not limited to, solid-state charge-coupled devices (CCD) image sensor chips. In one implementation of this embodiment, the imaging device 50 is a digital imaging device. The imaging device 50 is fixedly attaching to the vehicle 20 prior to collecting images. In one implementation of this embodiment, the imaging device 50 is fixedly attached to a robot prior to collecting images. In one implementation of this embodiment, the moving vehicle 20 is a robot capable of at least one rotation (e.g., pitch, yaw, or roll) or at least one translation in one dimension (e.g., X, Y, or Z).

As shown in the embodiment of FIGS. 1A and 1B, a vehicle 20 is moving with respect to a fixed object 30 located on the surface of the earth represented generally by numeral 32. At least a portion of the fixed object 30 is in the field of view 52 of the imaging device 50 at both of first time $t_1$ and second time $t_2$. In this exemplary implementation, the moving vehicle 20 is an airborne vehicle 20. The fixed object 30 is any stationary object such as a building, a road sign, or a geographic land feature (e.g., a mountain peak, a cluster of trees, a river bed, and the like). As shown in FIGS. 1A and 1B, the fixed object 30 is a palm tree 33 on the earth 32.

Figure 3:
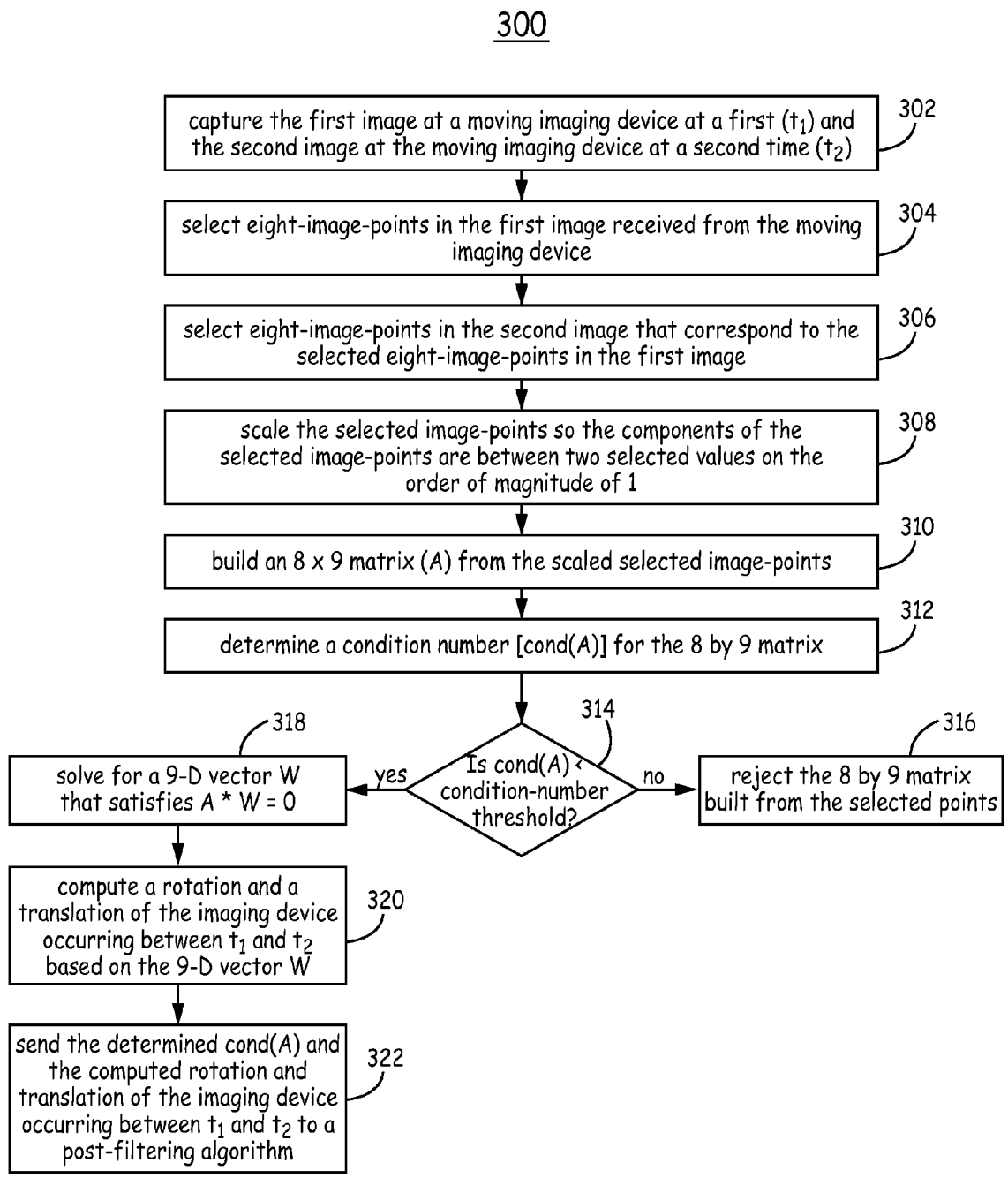
FIG. 3 is a flow diagram for a method to filter outliers in a camera motion estimation system.

FIG. 3 is a flow diagram for a method 300 to filter outliers in an image-aided motion-estimation system 11. Method 300 is described with reference to FIGS. 1A, 1B, and 2, although method 300 is applicable to other embodiments of an image-aided motion-estimation system. The storage medium 90 is a non-transitory processor-readable medium that includes program instructions operable, when executed by the at least one processor 80, to cause the image-aided motion-estimation system 10 to perform the steps of method 300.

At block 302, the first image 201 is captured at the moving imaging device 50 at a first time $t_1$ and a second image 202 is captured at the moving imaging device 50 at a second time $t_2$. The information indicative of the first image 201 is output from the imaging device 50 to the processor 80. The information indicative of the second image 202 is output from the imaging device 50 to the processor 80.

At block 304, the processor 80 selects eight-image-points 221-A to 228-A in a first image 201 received from a moving imaging device 50. The first image 201 includes eight-image-points indicated as 221-A to 228-A as shown in FIG. 2. The processor 80 implements software 85 to select the eight-image-points 221-A to 228-A in the information indicative of the first image 201 (FIG. 2) received from the moving imaging device 50. The eight-image-points 221-A to 228-A in the 2-dimensional plane of the first image 201 correspond to eight physical points in 3D space. The processor 80 selects image-points that correspond to physically distinctive features (such as, the end of a branch, a large rock on a hill, and the top right-hand corner of a window) in the first image 201. As defined herein, an image-point in the image is at least one pixel in the image. In one implementation of this embodiment, the feature of the object 30 in 3D space is distributed in the 2D image over an array of pixels. In this case, the image-point includes an array of neighboring pixels in the 2D image that corresponds to the feature in 3D space. For example, an image-point representative of a feature in the object 30 in 3D space can include a 5-by-5 array of pixels in the 2D image.

At block 306, the processor 80 selects eight-image-points 221-B to 228-B in a second image 202 that correspond to the selected eight-image-points 221-A to 228-A in the first image 201. The second image 202 includes eight-image-points indicated as 221-B to 228-B as shown in FIG. 2. The eight-image-points 221-B to 228-B in the 2-dimensional plane of the second image 202 correspond to the same eight physical points in 3D space associated with the eight-image-points 221-A to 228-A of the first image 201. The processor 80 implements software 85 to select the eight-image-points 221-B to 228-B in the information indicative of the second image 202 (FIG. 2) received from the moving imaging device 50.

Specifically, the physical feature being imaged at the first point 221-B in the second image 202 is selected to correspond to the physical feature being imaged at the first point 221-A in the first image 201; the physical feature being imaged at the second point 222-B in the second image 202 is selected to correspond to the physical feature being imaged at the second point 222-A in the first image 201; the physical feature being imaged at the third point 223-B in the second image 202 is selected to correspond to the physical feature being imaged at the third point 223-A in the first image 201; and so forth for each of the sets of eight-image-points 221-A to 228-A in first image 201 until all eight-image-points 221-B to 228-B in the second image 202 are selected.

At block 308, the processor 80 scales the selected image-points 221-A to 228-A and 221-B to 228-B so the scaled components of the selected image-points are, at most, between two selected values on the order magnitude of 1. As defined herein, the components of the selected image-points are the (X, Y) coordinates of the pixels that comprise the selected image-point. In order to avoid sending outliers to the post-filtering algorithm 86, scaling of selected image-points 221-A to 228-A and 221-B to 228-B to the order of magnitude of 1 is required. If the selected image-points 221-A to 228-A and 221-B to 228-B are not properly scaled, any numerical errors are amplified for a W vector (generated at block 318 as described below) that is solved based on the elements of a matrix A (generated at block 310 as described below). The range for proper scaling is a function of the position selected for the point (0, 0) in the two images 201 and 202. To simplify the algorithms, the same point of the image plane of the imaging device 50 (not the same physical feature imaged in the two images 201 and 203) is selected to be (0, 0). The image-points typically come in units of pixels (for example, 1 pixel, 2 by 3 pixels, or 5 by 5 pixels), and most images have a width of hundreds to thousands of pixels. Scaling the image-point to be order of magnitude 1 is done by dividing the horizontal coordinate of the image-point by the total image width and dividing the vertical coordinate of the image-point by the total image height. This scaling the image-points by dividing them by the total width/height of the image, results in the image-points being on the order magnitude of 1.

When the lower, left-hand corner of each of the images 201 and 202 formed on the image plane of the imaging device 50 is selected to be $(X_{image}, Y_{image})=(0, 0)$, the scaling of the selected image-points 221-A to 228-A and 221-B to 228-B is between 0 and 1. When the center of each of the images 201 and 202 formed on the image plane of the imaging device 50 is selected to be $(X_{image}, Y_{image})$ (0, 0), the left edge of the image is $X_{image}=-1$, and the right edge of the image is $X_{image}=+1$. In this latter case, the scaling of the components of selected image-points 221-A to 228-A (and 221-B to 228-B) is between −1 and +1. Some current implementations of the 8-point algorithm do not systematically and optimally scale the image-points to between two selected values to minimize outliers.

In one implementation of this embodiment, the scaled components of the selected image-points are, at most, between −1 and +1. In another implementation of this embodiment, the scaled components of the selected image-points are, at most, between 0 and +1. In yet another implementation of this embodiment, the scaled components of the selected image-points are, at most, between −1.4 and +1.4. In yet another implementation of this embodiment, the scaled components of the selected image-points are, at most, between 0 and +1.4. Other ranges on the order of magnitude of 1 are possible.

At block 310, the processor 80 builds an 8-by-9 matrix A from the scaled selected image-points 221-A to 228-A and 221-B to 228-B. The processor 80 executes the 8-point algorithm, which is included in the software 85 stored in the storage medium 90, for the eight-image-points in each of two images 201 and 202 to build an 8-by-9 matrix A. The "8-by-9 matrix A" is also referred to herein as "8-by-9 matrix" and "matrix A". Often, many elements of the imaging device calibration matrix are given in units of pixels. By dividing all these matrix elements by the number of pixels in the width of the image, all elements of the calibration matrix are also scaled in the range on the order of magnitude of 1 (e.g., 0 to 1, in this latter embodiment).

At block 312, the processor 80 determines a condition number, which is referred to herein as cond(A), for the 8-by-9 matrix A that was built during block 310. The value of condition number of the 8-by-9 matrix A is approximately equal to the ratio of the largest matrix elements to the smallest matrix elements, multiplied by a factor $F_1$. The factor $F_1$ is related to the geometry of the eight-image-points in 3D and the 2 imaging device locations in 3D. The condition number is the amount by which the error is amplified as known to one skilled in the art.

If the selected image-points 221-A to 228-A and 221-B to 228-B are in error by a few pixels, there is a fractional error. Consider the case in which an image includes M×M pixels and an image-point includes N×N pixels, where N and M are positive integers and N<<M. There is a pixel error of about N/2 when the set of N×N pixels forming the first image-point 221-B selected in the second image 202 is off by N/2 pixels from the set of N×N pixels forming the first image-point 221-A selected in the first image 201. The fractional error equals the (pixel error)/(image width) (e.g., (N/2)/M). When rotations and translations are computed from data with this fractional error, the fractional error (N/2)/M is amplified by a factor $F_2$, which ranges up to the condition number of matrix A. Thus, the resulting rotation errors are bounded by: (rotation errors)/(max rotation)<[cond(A)*(image-point error)/ (image width)]. Likewise, the resulting translation errors are bounded by: (translation errors)/(max translation)< [cond(A)*(image-point error)/(image width)].

In order to minimize the rotation errors and translation errors, it is important to keep the value of condition number of matrix A as small as possible. The scaling of the image-points to be approximately size 1, as described above with reference to block 308, advantageously reduces the value of condition number of matrix A. Currently available implementations of the 8-point algorithm do not adequately determine if sets of eight-image-points give poor numerical results as a vehicle moves along its trajectory.

Figure 4:
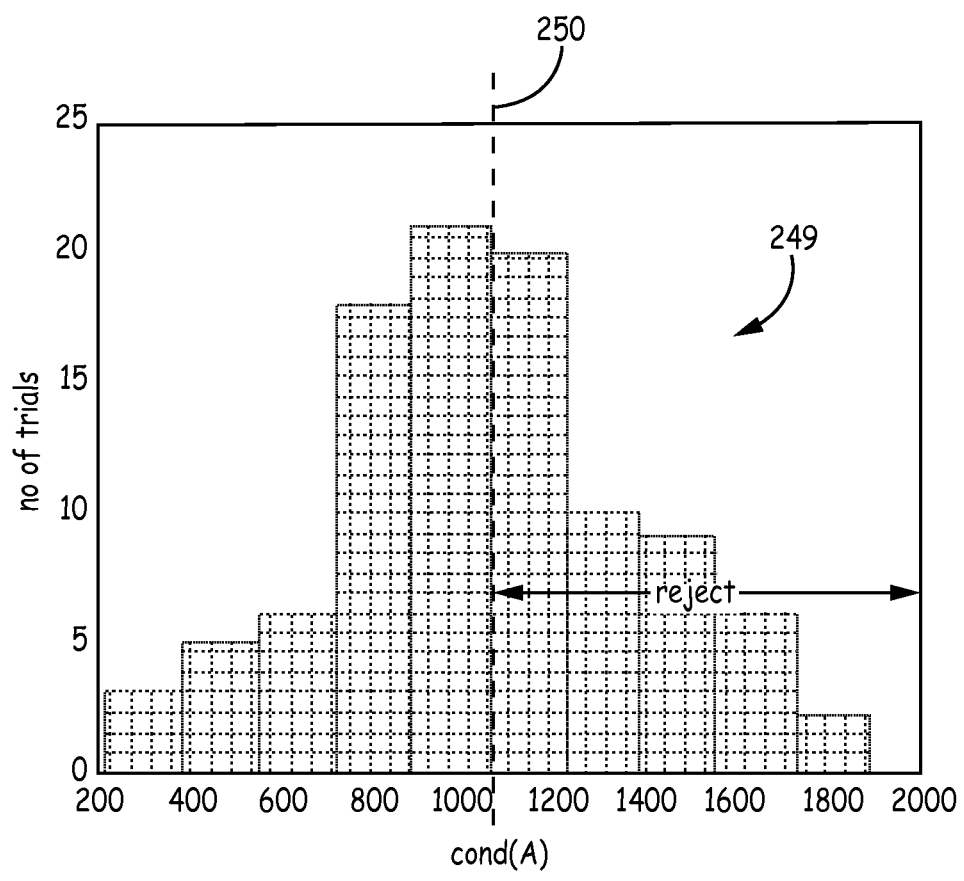
FIG. 4 shows an exemplary histogram of the condition number of matrix A for exemplary pairs of images generated by an imaging device.

At block 314, the processor 80 determines if the cond(A) for the 8-by-9 matrix A is less than, greater than, or equal to a condition-number threshold. The condition-number threshold is pre-selected and stored in memory 82. In one implementation of this embodiment, the condition-number threshold is provided based on statistics associated with the imaging device 50. FIG. 4 shows an exemplary histogram 249 of the condition number of matrix A for exemplary pairs of images generated by an imaging device. The shape of the histogram 249 is based on statistics associated with the imaging device 50. The horizontal axis of the histogram 249 is the condition number [cond(A)]. As shown in FIG. 4, the condition number ranges in value from 300 to 1800. In this embodiment, the condition-number threshold is selected to be the median value (i.e., 1000) of range of condition-number thresholds. This condition-number threshold is represented generally at the line 250 and the condition-number threshold is referred to herein as "condition-number threshold 250". In this exemplary case, any condition number having a value greater than the value 1000 at the line 250 in the histogram 249 is considered to be above the condition-number threshold. Other techniques or methods for selecting the condition-number threshold are possible. For example, the condition-number threshold can be preselected to be set to 750, 800, or 900.

The processor 80 compares the condition number cond(A) determined at block 312 with the condition-number threshold 250 stored in memory 82 and determines if the condition number cond(A) is greater than or equal to the condition-number threshold 250 based on the comparison. If the processor 80 determines the cond(A) for the 8-by-9 matrix A is greater than or equal to the condition-number threshold 250, the flow of method 300 proceeds to block 316.

At block 316, since the determined condition number is greater than or equal to a condition-number threshold 250, the processor 80 rejects the 8-by-9 matrix A built from scaled selected image-points 221-A to 228-A and 221-B to 228-B. When the processor 80 rejects the built 8-by-9 matrix A, the 8-by-9 matrix A is deleted from the memory 82. The rejected 8-by-9 matrix A is not used to compute a rotation and a translation to be sent to the post-filtering algorithm 86.

When the processor 80 determines the cond(A) for the 8-by-9 matrix A is less than the condition-number threshold 250 at block 314, the flow of method 300 proceeds to block 318. At block 318, the processor 80 prepares to send data to the post-filter algorithm 86 by solving for a 9-dimensional vector (W) that satisfies A*W=0. Linear algebra is used to solve for the 9-dimensional W vector that satisfies A*W=0.

The geometrical difficulties that have not previously been solved are now discussed to clearly show the relevance of the determined cond(A) to the solution for 9-dimensional W vector that satisfies A*W=0. It has been previously understood, in prior art, when the eight-image-points in 3D and two imaging device positions in 3D space all lie on the same hyperboloid surface in 3-dimensional (3D) space, non-unique solutions are obtained for the W vector. However, when the eight-image-points in 3D and two imaging device positions in 3D space all lie on any quadric surface, not just on a hyperboloid surface, non-unique solutions are also obtained. A quadric or quadric surface, is any D-dimensional hypersurface in (D+1)-dimensional space defined as the locus of zeros of a quadratic polynomial. Quadric surfaces include ellipsoid surfaces, cone surfaces, spheres, as well as hyperboloid surfaces. When the eight-image-points in 3D and two imaging device positions in 3D 58 and 59 all lie on any quadric surface (not just on a hyperboloid surface) in 3-dimensional space, rank(A) drops to 7, and there are two 9-dimensional solution vectors, $W_1$ and $W_2$, for the matrix equation A*W=0. When rank(A)=7, cond (A)=∞. The sets of eight-image-points that give non-unique solutions are removed by eliminating the sets of eight-image-points that produce a large cond(A).

Any 9 generic points in 3D define a unique quadric surface. A generic curve in 3D intersects a generic surface in 3D. The probability of 10 points in 3D all laying on the same quadric surface is essentially zero. Since any fixed eight-image-points in 3D and one imaging device 50 location in 3D lay on unique quadric surface, as the vehicle 20 moves along a trajectory, the chances that that trajectory curve intersects the quadric surface at some point in time, is quite large. So there is a high probability that, at isolated points along any trajectory, sets of eight-image-points are obtained in both images that result in cond(A) becoming extremely large. The process described with reference to block 316 mitigates this problem by throwing away any subset of eight-image-points that gives large cond(A).

Figure 5:
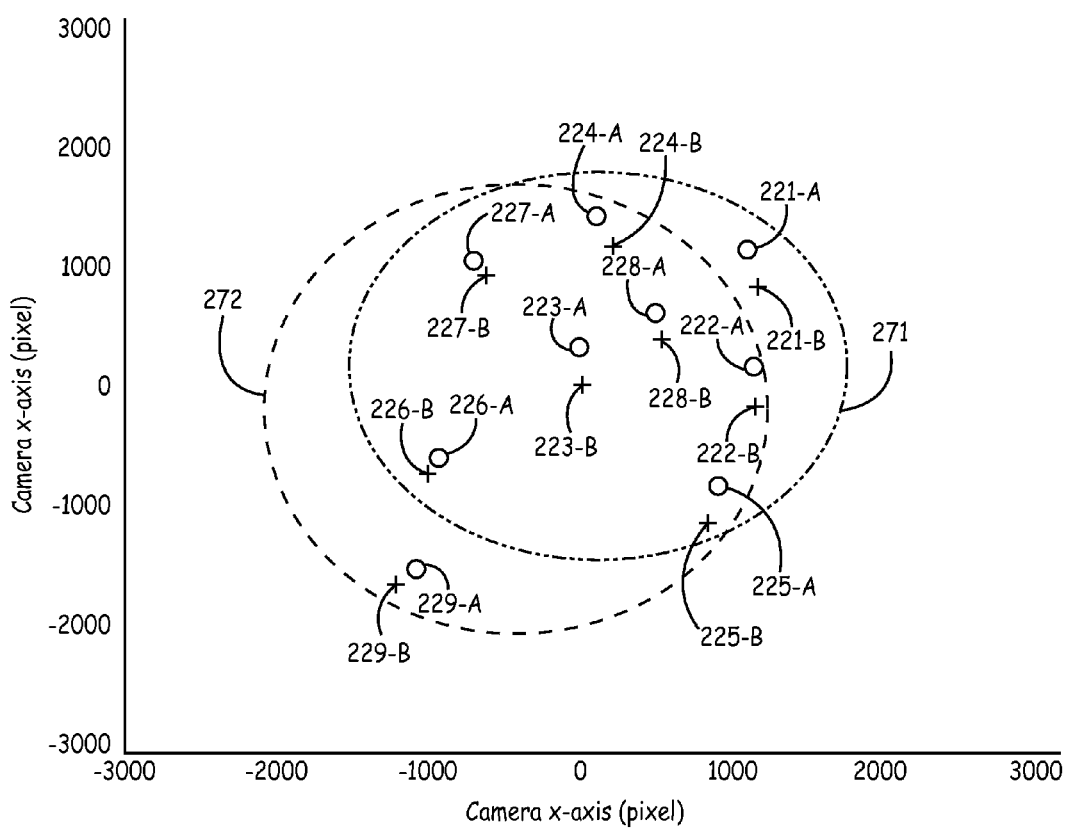
FIG. 5 shows two sets of eight-image-points selected from two sets of nine points in two images.

To clearly illustrate the randomness of a data set being an outlier that negatively impacts output from post-filtering algorithm, two sets of data are described with reference to FIGS. 5-7. FIG. 5 shows two sets 271 and 272 of eight-image-points selected from two sets of nine points in two images. The first set of nine points associated with a first image (for example, first image 201) includes the nine points 221-A to 229-A (represented generally as circles). The second set of nine points associated with a second image (for example, second image 202) includes the nine points 221-B to 229-B (represented generally as crosses). The first set 271 includes eight-image-points 221-A to 228-A from a first image and includes eight-image-points 221-B to 228-B from a second image. The second set 272 includes eight-image-points 222-A to 229-A from the first image and includes eight-image-points 222-B to 229-B from the second image. Thus, the image sets 271 and 272 both include a common subset of seven-image-points 222-228 from the first image and both include seven-image-points 222-B to 238 from the second image.

Figure 6:
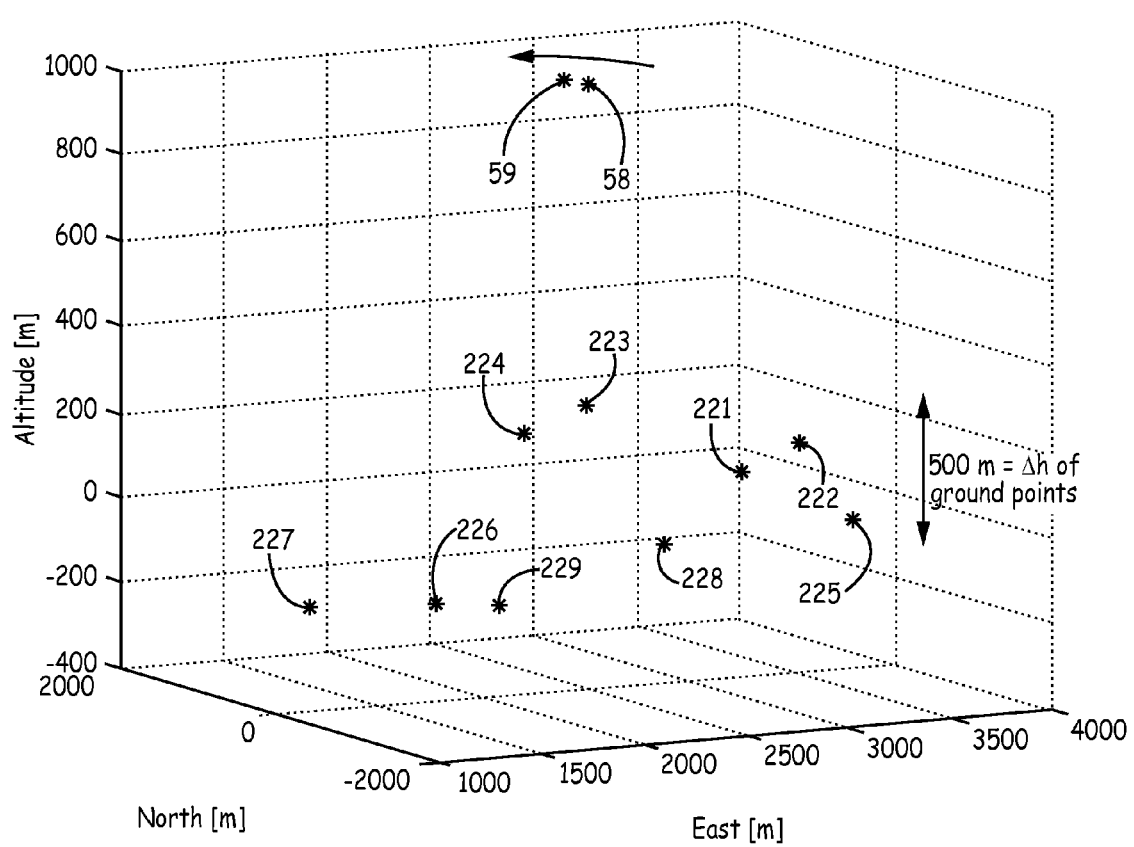
FIG. 6 shows the distribution in 3-dimensional space for the nine 3-dimensional points associated with the images of FIG. 5 and the two camera-location points.

FIG. 6 shows the distribution in 3-dimensional space for the nine 3D points 221-229 associated with the images of FIG. 5 and the two camera-location points 58 and 59. The altitudes of the nine points 221-A to 229-A are distributed over a range of 500 meters. The 3D points 221-229 are selected from positions spread over a volume of 3000 meters by 3000 meters by 500 meters.

Analysis of the two sets 271 and 272 (FIG. 5) of pairs of eight-image-points taken from the set of nine points 221-A to 229-A and the set of nine points 221-B to 229-B produce very different results even though they both include the common subset of the seven-image-points 222-A to 228-A and the seven-image-points 222-B to 238-B. The 3D points associated with the first set 271 of the eight-image-points 221-A to 228-A and the 2 camera-location points do not lay on a quadric surface. Likewise, the 3D points associated with the first set 271 of the eight-image-points 221-B to 128-B and the 2 camera-location points do not lay on a quadric surface. However, the second set 272 of 3D points associated with the eight-image-points 222-A to 229-A and eight image points 222-B to 229-B, and 2 camera-location points, all lay on a quadric surface.

Figure 7:
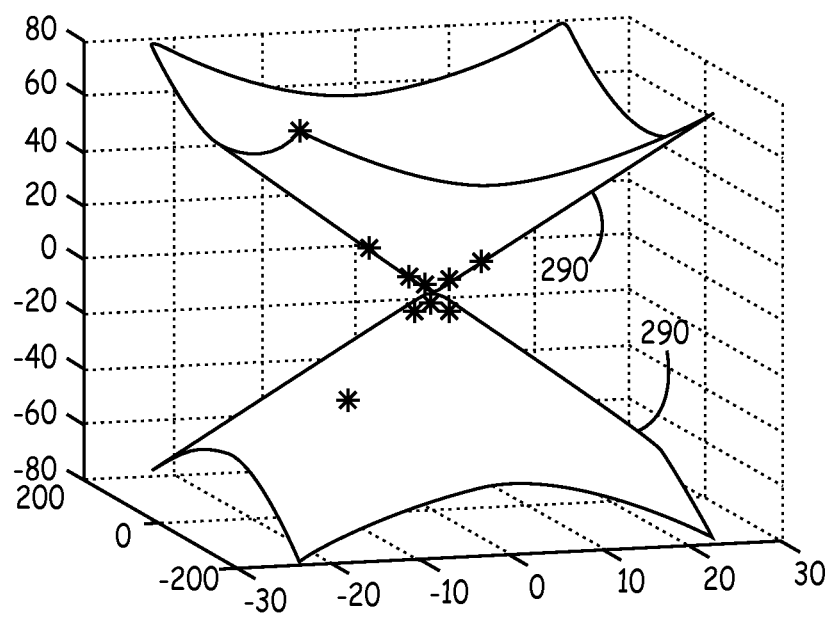
FIG. 7 shows the distribution on a hyperboloid of eight of the nine-image-points and 2 camera-location points associated with the images of FIG. 5 and the two camera-location points.

FIG. 7 shows the distribution on a hyperboloid 290 of eight of the nine-image-points and 2 camera-location points. The hyperboloid 290 is a quadric surface. When solved for A*W=0, the data points the second set 272 of the eight-image-points 222-A to 229-A and 222-B to 229-B and 2 camera-location point1 result in two solutions. If this data were sent to the post-filter algorithm 86, the post-filter algorithm 86 would be unable to generate good data. However, the data points the second set 272 of the eight-image-points 222-A to 229-A and 222-B to 229-B and 2 camera-location points are rejected at block 316, since the cond(A) for the 8-by-9 matrix A generated from those data points is greater than the condition-number threshold 250.

At block 320, the processor 80 computes a rotation and a translation of the imaging device 50 occurring between the first time $t_1$ and the second time $t_2$ based on the 9-dimensional W vector determined at block 318. Specifically, the W vector is used to construct the rotation and translation of the imaging device 50 during the time $\Delta t = t_2 - t_1$ between the capture of the two images 201 and 203.

At block 322, the processor 80 sends the computed rotation of the imaging device 50 and the computed translation of the imaging device 50 occurring between the first time and the second time to a post-filtering algorithm 86.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs)."

In this manner, the optically-aided-navigation system 10 filters outliers in an image-aided motion-estimation system 11 so that the post-filtering algorithm 86 receives good data and does not receive data that would prevent the post-filtering algorithm 86 from proving an accurate result.

EXAMPLE EMBODIMENTS

Example 1 includes a method to filter outliers in an image-aided motion-estimation system, the method comprising: selecting eight-image-points in a first image received from a moving imaging device at at least one processor; selecting eight-image-points in a second image that correspond to the selected eight-image-points in the first image at the at least one processor, the second image being received from the moving imaging device; scaling the selected image-points at the at least one processor so the components of the selected image-points are between two selected values on the order magnitude of 1; building an 8-by-9 matrix (A) from the scaled selected image-points at the at least one processor; determining a condition number for the 8-by-9 matrix at the at least one processor; and rejecting the 8-by-9 matrix built from the selected image-points when the determined condition number is greater than or equal to a condition-number threshold.

Example 2 includes the method of Example 1, further comprising: capturing the first image at the moving imaging device at a first time; outputting information indicative of the first image to the at least one processor; capturing the second image at the moving imaging device at a second time; and outputting information indicative of the second image to the at least one processor.

Example 3 includes the method of any of Examples 1-2, further comprising: solving for a 9-dimensional vector (W) that satisfies A*W=0 when the determined condition number is less than the condition-number threshold.

Example 4 includes the method of Example 3, further comprising: computing a rotation and a translation of the imaging device occurring between the first time and the second time based on the 9-dimensional vector (W).

Example 5 includes the method of any of Examples 1-4, further comprising: sending the computed rotation of the imaging device and the computed translation of the imaging device occurring between the first time and the second time to a post-filtering algorithm.

Example 6 includes the method of any of Examples 1-5, wherein rejecting the 8-by-9 matrix built from the selected image-points when the determined condition number is greater than or equal to the condition-number threshold comprises: comparing the determined condition number with the condition-number threshold; determining the condition number is greater than or equal to the condition-number threshold based on the comparison; and deleting the 8-by-9 matrix built from the selected image-points without sending a computed rotation and the computed translation to a post-filtering algorithm.

Example 7 includes the method of any of Examples 1-6, further comprising fixedly positioning the imaging device in a vehicle prior to collecting images.

Example 8 includes the method of any of Examples 1-7, further comprising fixedly positioning the imaging device on a robot prior to collecting images.

Example 9 includes the method of any of Examples 1-8, further comprising providing the condition-number threshold based on statistics associated with the imaging device.

Example 10 includes a program product to filter outliers in an image-aided motion-estimation system, the program-product comprising a non-transitory processor-readable medium on which program instructions are embodied, wherein the program instructions are operable, when executed by at least one processor included in the image-aided motion-estimation system, to cause the image-aided motion-estimation system to: select eight-image-points in a first image captured at a moving imaging device at a first time and received at the at least one processor; select eight-image-points in a second image that correspond to the selected eight-image-points in the first image, the second image being captured at the moving imaging device at a second time; scale the selected image-points so the components of the selected image-points are between two selected values on the order magnitude of 1; build an 8-by-9 matrix (A) from the selected image-points; determine a condition number for the 8-by-9 matrix; and reject the 8-by-9 matrix built from the selected image-points when the determined condition number is greater than a condition-number threshold.

Example 11 includes the program product to filter outliers in the image-aided motion-estimation system of Example 10, wherein the program instructions are operable, when executed by the at least one processor, to further cause the image-aided motion-estimation system to: solve for a 9-dimensional vector (W) that satisfies A*W=0 when the determined condition number is less than the condition-number threshold.

Example 12 includes the program product to filter outliers in the image-aided motion-estimation system of Example 11, wherein the program instructions are operable, when executed by the at least one processor, to further cause the image-aided motion-estimation system to: compute a rotation and a translation of the imaging device occurring between the first time and the second time based on the 9-dimensional vector (W).

Example 13 includes the program product to filter outliers in the image-aided motion-estimation system of Example 12, wherein the program instructions are operable, when executed by the at least one processor, to further cause the image-aided motion-estimation system to: output the computed rotation of the imaging device and the computed translation of the imaging device occurring between the first time and the second time to a post-filtering algorithm; and output the determined condition number to the post-filtering algorithm.

Example 14 includes the program product to filter outliers in the image-aided motion-estimation system of any of Examples 10-13, wherein the program instructions operable to reject the 8-by-9 matrix built from the selected image-points when the determined condition number is greater than a condition-number threshold are operable, when executed by the at least one processor, to cause the image-aided motion-estimation system to: compare the determined condition number with the condition-number threshold; determine the condition number is greater than or equal to the condition-number threshold based on the comparison; and delete the 8-by-9 matrix built from the selected image-points without sending a computed rotation and a computed translation to a post-filtering algorithm.

Example 15 includes an optically-aided-navigation system to remove outliers in an image-aided motion-estimation system, the system comprising: an imaging device configured to capture a first image at a first time from a first position and to capture a second image at a second time from a second position; at least one processor communicatively coupled to the imaging device, the at least one processor configured to execute software stored in a storage medium to: input information indicative of the first image from the imaging device; select eight-image-points in the first image; input information indicative of the second image from the imaging device; select eight-image-points in the second image that correspond to the selected eight-image-points in the first image; scale the selected image-points so the components of the selected image-points are between two selected values on the order magnitude of 1; build an 8-by-9 matrix from the scaled selected image-points; determine a condition number for the 8-by-9 matrix; and filter data sent to a post-filtering algorithm based on the determined condition number.

Example 16 includes the optically-aided-navigation system of Example 15, the system further comprising: the post-filtering algorithm communicatively coupled to the at least one processor.

Example 17 includes the optically-aided-navigation system of any of Examples 15-16, wherein, when the determined condition number is less than the condition-number threshold, the at least one processor is configured to filter data sent to the post-filtering algorithm by: computing a rotation and a translation of the imaging device occurring between the first time and the second time based on the 9-dimensional vector (W); outputting the computed rotation of the imaging device and the computed translation of the imaging device occurring between the first time and the second time to a post-filtering algorithm; and outputting the determined condition number to the post-filtering algorithm Example 18 includes the optically-aided-navigation system of any of Examples 15-17, wherein, when the determined condition number is greater than or equal to the condition-number threshold, the at least one processor is configured to filter data sent to the post-filtering algorithm by: rejecting the 8-by-9 matrix built from the selected image-points when the determined condition number is greater than or equal to a condition-number threshold.

Example 19 includes the optically-aided-navigation system of any of Examples 15-18, the system further comprising: a global positioning system communicatively coupled to the at least one processor, wherein when data output from the global positioning system is interrupted, the at least one processor signals the imaging device to collect the first image and the second image.

Example 20 includes the optically-aided-navigation system of any of Examples 15-19, wherein the post-filtering algorithm is a RANdom SAmple Consensus (RANSAC) algorithm.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:
1. A method to filter outliers in an image-aided motion-estimation system, the method comprising:
 removing, from data sent to a RANdom SAmple Consensus (RANSAC) algorithm, which functions as a post-filtering algorithm, data associated with a plurality of bad sets of eight-image-points and two camera positions by:

selecting eight-image-points in a first image received from a moving imaging device at at least one processor;

selecting eight-image-points in a second image that correspond to the selected eight-image-points in the first image at the at least one processor, the second image being received from the moving imaging device;

scaling the selected image-points at the at least one processor so the components of the selected image-points are between two selected values on the order magnitude of 1;

building an 8-by-9 matrix (A) from the scaled selected image-points at the at least one processor;

determining a condition number for the 8-by-9 matrix at the at least one processor; and rejecting the 8-by-9 matrix built from the selected image-points when the determined condition number is greater than or equal to a condition-number threshold, wherein a rejected 8-by-9 matrix (A) is not used to compute a rotation and a translation to be sent to the RANSAC algorithm; and sending a computed rotation of the imaging device and a computed translation of the imaging device occurring between a first time and a second time, responsive to removing the data associated with the plurality of bad sets of eight-image-points and two camera positions, to the RANSAC algorithm, wherein the RANSAC algorithm obtains a good solution.

2. The method of claim 1, further comprising:
capturing the first image at the moving imaging device at a first time;
outputting information indicative of the first image to the at least one processor;
capturing the second image at the moving imaging device at a second time; ands
outputting information indicative of the second image to the at least one processor.

3. The method of claim 2, further comprising:
responsive to the rejecting and prior to sending the computed rotation and the computed translation to the RANSAC algorithm, solving for the 9-dimensional vector (W) that satisfies A*W=0 when the determined condition number is less than the condition-number threshold.

4. The method of claim 3, further comprising:
responsive to solving for the 9-dimensional vector (W) and prior to sending the computed rotation and the computed translation to the RANSAC algorithm, computing the rotation and the translation of the imaging device occurring between the first time and the second time based on the 9-dimensional vector (W).

5. The method of claim 1, wherein rejecting the 8-by-9 matrix built from the selected image-points when the determined condition number is greater than or equal to the condition-number threshold comprises:
comparing the determined condition number with the condition-number threshold;
determining the condition number is greater than or equal to the condition-number threshold based on the comparison; and
deleting the 8-by-9 matrix built from the selected image-points without sending a computed rotation and the computed translation to the RANSAC algorithm.

6. The method of claim 1, further comprising fixedly positioning the imaging device in a vehicle prior to collecting images.

7. The method of claim 1, further comprising fixedly positioning the imaging device on a robot prior to collecting images.

8. The method of claim 1, further comprising providing the condition-number threshold based on statistics associated with the imaging device.

9. A program product to filter outliers in an image-aided motion-estimation system, the program-product comprising a non-transitory processor-readable medium on which program instructions are embodied, wherein the program instructions are operable, when executed by at least one processor included in the image-aided motion-estimation system, to cause the image-aided motion-estimation system to:
remove, from data sent to a RANdom SAmple Consensus (RANSAC) algorithm, which functions as a post-filtering algorithm, data associated with a plurality of bad sets of eight-image-points and two camera positions by causing the image-aided motion-estimation system to:
select eight-image-points in a first image captured at a moving imaging device at a first time and received at the at least one processor;
select eight-image-points in a second image that correspond to the selected eight-image-points in the first image, the second image being captured at the moving imaging device at a second time;
scale the selected image-points so the components of the selected image-points are between two selected values on the order magnitude of 1;
build an 8-by-9 matrix (A) from the selected image-points;
determine a condition number for the 8-by-9 matrix; and
reject the 8-by-9 matrix built from the selected image-points when the determined condition number is greater than a condition-number threshold, wherein a rejected 8-by-9 matrix (A) is not used to compute a rotation and a translation to be sent to the RANSAC algorithm; and
send a computed rotation of the imaging device and a computed translation of the imaging device occurring between a first time and a second time, responsive to removing the data associated with the plurality of bad sets of eight-image-points and two camera positions, to the RANSAC algorithm, wherein the RANSAC algorithm obtains a good solution.

10. The program product to filter outliers in the image-aided motion-estimation system of claim 9, wherein the program instructions are operable, when executed by the at least one processor, to further cause the image-aided motion-estimation system to:
responsive to the rejecting and prior to sending the computed rotation and the computed translation to the RANSAC algorithm,
solve for a 9-dimensional vector (W) that satisfies A*W=0 when the determined condition number is less than the condition-number threshold; and
compute a rotation and a translation of the imaging device occurring between the first time and the second time based on the 9-dimensional vector (W).

11. The program product to filter outliers in the image-aided motion-estimation system of claim 10, wherein the program instructions are operable, when executed by the at least one processor, to further cause the image-aided motion-estimation system to:
send the determined condition number to the RANSAC algorithm with the computed rotation and the computed translation of the imaging device.

12. The program product to filter outliers in the image-aided motion-estimation system of claim 9, wherein the program instructions operable to reject the 8-by-9 matrix built from the selected image-points when the determined condition number is greater than the condition-number threshold are operable, when executed by the at least one processor, to cause the image-aided motion-estimation system to:
   compare the determined condition number with the condition-number threshold;
   determine the condition number is greater than or equal to the condition-number threshold based on the comparison; and
   delete the 8-by-9 matrix built from the selected image-points without sending the computed rotation and the computed translation to the RANSAC algorithm.

13. An optically-aided-navigation system to remove outliers in an image-aided motion-estimation system, the system comprising:
   an imaging device configured to capture a first image at a first time from a first position and to capture a second image at a second time from a second position;
   at least one processor communicatively coupled to the imaging device, the at least one processor configured to execute software stored in a storage medium to:
   remove, from data sent to a RANdom SAmple Consensus (RANSAC) algorithm, data associated with a plurality of bad sets of eight-image-points and two camera positions by:
      inputting information indicative of the first image from the imaging device;
      selecting eight-image-points in the first image;
      inputting information indicative of the second image from the imaging device;
      selecting eight-image-points in the second image that correspond to the selected eight-image-points in the first image;
      scaling the selected image-points so the components of the selected image-points are between two selected values on the order magnitude of 1;
      building an 8-by-9 matrix (A) from the scaled selected image-points;
      determining a condition number for the 8-by-9 matrix to be compared to a condition-number threshold; and
      rejecting the 8-by-9 matrix built from the selected image-points when the determined condition number is greater than or equal to a condition-number threshold, wherein a rejected 8-by-9 matrix (A) is not used to compute a rotation and a translation to be sent to the RANSAC algorithm; and
   sending a computed rotation of the imaging device and a computed translation of the imaging device occurring between a first time and a second time, responsive to removing the data associated with the plurality of bad sets of eight-image-points and two camera positions, to the RANSAC algorithm, wherein the number of outliers sent to the RANSAC algorithm are limited and the RANSAC algorithm obtains a good solution.

14. The optically-aided-navigation system of claim 13, the system further comprising:
   the RANSAC algorithm communicatively coupled to the at least one processer.

15. The optically-aided-navigation system of claim 13, wherein, responsive to the rejecting the at least one processor is configured to:
   solve for the 9-dimensional vector (W) that satisfies $A*W=0$ when the determined condition number is less than the condition-number threshold; and
   comput a rotation and a translation of the imaging device occurring between the first time and the second time based on the 9-dimensional vector (W); and
   outputting the determined condition number to the RANSAC algorithm with the computed rotation of the imaging device and the computed translation of the imaging device.

16. The optically-aided-navigation system of claim 13, the system further comprising:
   a global positioning system communicatively coupled to the at least one processor, wherein when data output from the global positioning system is interrupted, the at least one processor signals the imaging device to collect the first image and the second image.

* * * * *